United States Patent
Hirosawa

(10) Patent No.: US 10,179,278 B2
(45) Date of Patent: Jan. 15, 2019

(54) STORAGE MEDIUM HAVING STORED THEREIN GAME PROGRAM, GAME APPARATUS, GAME SYSTEM, AND GAME PROCESSING METHOD

(71) Applicant: NINTENDO CO., LTD., Kyoto (JP)

(72) Inventor: Teruyuki Hirosawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 180 days.

(21) Appl. No.: 13/763,046

(22) Filed: Feb. 8, 2013

(65) Prior Publication Data

US 2014/0106885 A1   Apr. 17, 2014

(30) Foreign Application Priority Data

Oct. 17, 2012   (JP) .................................. 2012-229476

(51) Int. Cl.

| | | |
|---|---|---|
| *A63F 13/814* | (2014.01) | |
| *A63F 13/98* | (2014.01) | |
| *A63F 13/20* | (2014.01) | |
| *A63F 13/2145* | (2014.01) | |
| *A63F 13/54* | (2014.01) | |
| *A63F 13/5375* | (2014.01) | |

(52) U.S. Cl.
CPC .............. *A63F 13/02* (2013.01); *A63F 13/06* (2013.01); *A63F 13/2145* (2014.09); *A63F 13/54* (2014.09); *A63F 13/814* (2014.09); *A63F 13/5375* (2014.09)

(58) Field of Classification Search
CPC ....................... A63F 2300/8047; A63F 13/814
USPC ...................................................... 463/32, 35
See application file for complete search history.

(56) References Cited

U.S. PATENT DOCUMENTS

| | | | | |
|---|---|---|---|---|
| 4,395,760 A | * | 7/1983 | Soski et al. ........................ | 463/3 |
| 6,554,711 B1 | * | 4/2003 | Kawasaki et al. .............. | 463/43 |
| 7,019,205 B1 | * | 3/2006 | Fujisawa et al. ............... | 84/609 |
| 7,459,624 B2 | | 12/2008 | Schmidt et al. | |
| 7,625,284 B2 | * | 12/2009 | Kay et al. ........................ | 463/31 |
| 8,003,872 B2 | | 8/2011 | Lopiccolo et al. | |
| 8,409,007 B2 | * | 4/2013 | Kobayashi et al. ............ | 463/42 |
| 8,444,486 B2 | * | 5/2013 | Kay et al. ........................ | 463/31 |

(Continued)

FOREIGN PATENT DOCUMENTS

| | | |
|---|---|---|
| JP | 2002-301262 | 10/2002 |
| JP | 2005-198974 | 7/2005 |

(Continued)

OTHER PUBLICATIONS

Soundrangers: http://www.soundrangers.com/index.cfm?currentpage=1&fuseaction=category.display&category_id=501, pp. 1 and 2.*

(Continued)

*Primary Examiner* — Jay Liddle
(74) *Attorney, Agent, or Firm* — Nixon & Vanderhye P.C.

(57) ABSTRACT

An input of a user is received from an input unit, and in accordance with the input of the user, an operation object displayed on a display screen moves in a predetermined movement-allowed range. A plurality of sound objects appear and move in the display screen, the sound objects set for sounds to be output in accordance with a composition to be performed. Then, if the operation object and each sound object have made contact with each other, the sound set for the sound object is output.

13 Claims, 7 Drawing Sheets

(56) References Cited

U.S. PATENT DOCUMENTS

| | | | |
|---|---|---|---|
| 8,556,717 B2* | 10/2013 | Yamada et al. | 463/35 |
| 8,686,939 B2* | 4/2014 | Mao et al. | 345/156 |
| 8,690,670 B2* | 4/2014 | Kay et al. | 463/31 |
| 8,702,509 B2* | 4/2014 | Yamamoto | 463/31 |
| 2011/0003639 A1 | 1/2011 | Takehiro | |
| 2012/0172099 A1* | 7/2012 | Migitera et al. | 463/7 |
| 2012/0172121 A1* | 7/2012 | Migitera | 463/31 |
| 2012/0231862 A1 | 9/2012 | Yamamoto | |
| 2013/0260877 A1* | 10/2013 | Katagai et al. | 463/29 |

FOREIGN PATENT DOCUMENTS

| | | |
|---|---|---|
| JP | 2008-253440 | 10/2008 |
| JP | 2011-11008 | 1/2011 |
| JP | 2012-187136 | 10/2012 |

OTHER PUBLICATIONS

Meehan, Darren, "BIT.TRIP BEAT: A Great Musical Twist on Pong," Aug. 29, 2012, available at http://android.appstorm.net/reviews/games/bit-trip-beat-a-great-musical-twist-on-pong/, last accessed Nov. 7, 2014.*
"Wii Music" Drums Free Play, https://www.youtube.com/watch?v=AhZ1IbYNEe8, uploaded on Nov. 13, 2008.
"Daigasso! Band Brothers", http://en.wikipedia.org/wiki/Daigasso! Band Brothers, pp. 1-10, release date: Dec. 2, 2004, (accessed Oct. 8, 2014).
"Jam with the Band", http://en.wikipedia.org/wiki/Jam_with_the_Band, pp. 1-3, release dates: (JP) Jun. 26, 2008 and (EU) May 21, 2010, (accessed Oct. 8, 2014).

* cited by examiner

F I G. 1
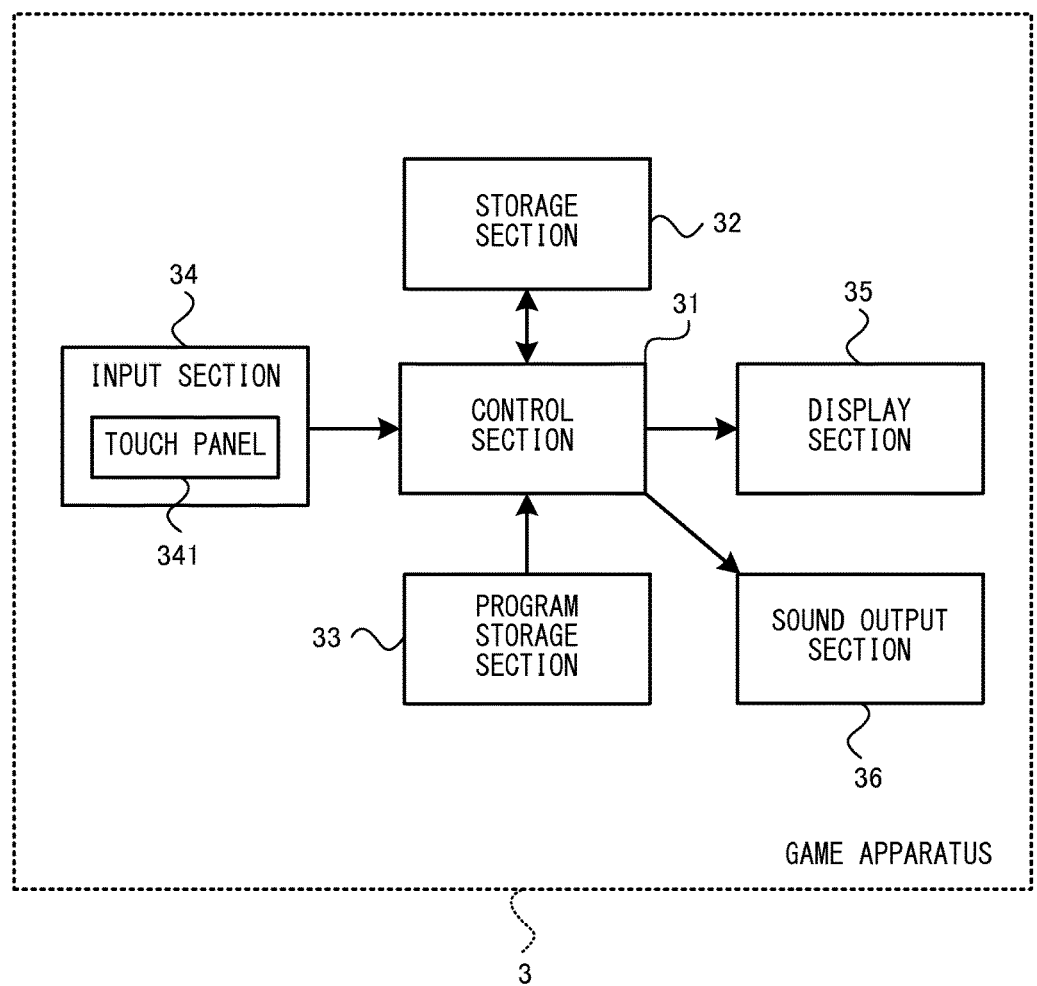

STORAGE MEDIUM HAVING STORED THEREIN GAME PROGRAM, GAME APPARATUS, GAME SYSTEM, AND GAME PROCESSING METHOD

CROSS REFERENCE TO RELATED APPLICATION

The disclosure of Japanese Patent Application No. 2012-229476, filed on Oct. 17, 2012, is incorporated herein by reference.

FIELD

The technology shown here relates to a storage medium having stored therein a game program, a game apparatus, a game system, and a game processing method, and in particular, relates to a storage medium having stored therein having a game program that, for example, controls the process of causing an operation object to move so as to output a sound, and a game apparatus, a game system, and a game processing method that, for example, control the process of causing an operation object to move so as to output a sound.

BACKGROUND AND SUMMARY

Conventionally, there is known a music game apparatus that generates sounds differing in accordance with an input to a touch panel. For example, the music game apparatus generates sounds in accordance with a touch operation performed so as to touch, via the touch panel, objects that appear in accordance with the performance of a composition.

However, to achieve a music game where sounds are generated that differ in accordance with an input to an input apparatus such as a touch panel, the level of difficulty of the operation may be increased.

Therefore, it is an object of an exemplary embodiment to provide a storage medium having stored therein a game program that makes it possible to enjoy a music game by an easy operation, and a game apparatus, a game system, and a game processing method that make it possible to enjoy a music game by an easy operation.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of a game apparatus according to the exemplary embodiment is a game apparatus for outputting a sound based on an operation input. The game apparatus includes an input reception unit, an operation object movement control unit, a sound object movement control unit, and a sound output control unit. The input reception unit receives an input of a user from a touch panel provided so as to cover a display screen. The operation object movement control unit, in accordance with the input of the user, causes an operation object displayed on the display screen to move along a movement-allowed path provided so as to extend in a predetermined direction in a virtual world displayed on the display screen. The sound object movement control unit causes a plurality of types of sound objects, set in accordance with steps in a composition, to appear in the display screen in accordance with a performance of the composition, and configured to cause the plurality of types of sound objects to move so as to cross the movement-allowed path. The sound output control unit, if the operation object and each sound object have made contact with each other, outputs a sound set for the sound object.

On the basis of the above, an operation object is brought into contact with a plurality of types of sound objects that appear in accordance with steps in a composition, whereby sounds set for the respective sound objects are output. This makes it possible to achieve a music game where a user enjoys performing the composition by bringing the sound objects into contact with the operation object. Here, a touch operation is performed on a screen using a touch panel, thereby causing the operation object to move to any position on a movement-allowed path displayed in superimposition with the touch position. Then, the touch position is maintained, thereby causing the operation object to stop at the position. This facilitates a movement operation and a stoppage operation, which makes it possible to easily perform the operation of placing the operation object at the positions to which the sound objects are to move. For example, the user causes the operation object to move in advance to the positions on the movement-allowed path that crosses the paths along which the sound objects move, and thereby can perform the operation of waiting for the sound objects to reach the movement-allowed path, and then bring them into contact with the operation object. This eliminates the need to perform the operation of meeting the timing of the arrival of each sound object, which makes it possible to enjoy a music game by an easy operation.

An exemplary configuration of a computer-readable storage medium having stored therein a game program according to the exemplary embodiment is a computer-readable storage medium having stored therein a game program to be executed by a computer of an apparatus for outputting a sound based on an operation input. The game program receives an input of a user from an input unit; in accordance with the input of the user, causes an operation object displayed on a display screen to move in a predetermined movement-allowed range; causes a plurality of sound objects to appear and move in the display screen, the sound objects set for sounds to be output in accordance with a composition to be performed; and if the operation object and each sound object have made contact with each other, outputs the sound set for the sound object.

On the basis of the above, an operation object is brought into contact with sound objects that appear in accordance with a composition, whereby sounds set for the respective sound objects are output. This makes it possible to achieve a music game where a user enjoys performing the composition by bringing the sound objects into contact with the operation object. Here, it is possible to cause the operation object to move in a movement-allowed range so as to make contact with the sound objects, in accordance with an input of the user, and it is possible to output sounds based on the composition merely by placing the operation object at the positions to which the sound objects are to move. This makes it possible to enjoy a music game by an easy operation. For example, the user causes the operation object to move in advance to the paths along which the sound objects move, and thereby can perform the operation of waiting for the sound objects to reach the movement-allowed range, and then bring them into contact with the operation object. This eliminates the need to perform the operation of meeting the timing of the arrival of each sound object, which makes it possible to enjoy a music game by an easy operation.

In addition, the input unit may be formed of a pointing device that indicates a position in the display screen. In this case, the operation object may move in the movement-allowed range in accordance with the input of the user using the pointing device.

On the basis of the above, a position on a screen is designated using a pointing device, thereby causing the operation object to move to the designated position. Then, the position is maintained, thereby causing the operation object to stop at the position as well. This facilitates a movement operation and a stoppage operation, which makes it possible to easily perform the operation of placing the operation object at the positions to which the sound objects are to move.

In addition, the pointing device may be formed of a touch panel provided so as to cover the display screen. In this case, the operation object may move in the movement-allowed range so as to overlap the position in the display screen in accordance with an indication on the touch panel.

On the basis of the above, a touch operation is performed on a screen using a touch panel, thereby causing the operation object to move to the position displayed in superimposition with the touch position. Then, the touch position is maintained, thereby causing the operation object to stop at the position as well. This facilitates a movement operation and a stoppage operation, which makes it possible to easily perform the operation of placing the operation object at the positions to which the sound objects are to move.

In addition, the plurality of sound objects may be formed of a plurality of types of sound objects differing in accordance with steps of sounds to be output.

On the basis of the above, different types of sound objects appear depending on steps. This makes it possible to predict the sounds to be output if bringing the sound objects into contact with the operation object.

In addition, a plurality of movement paths may be set in accordance with the steps of the respective sounds to be output, and the sound objects may move along the movement paths based on the steps set for the respective sound objects.

On the basis of the above, the sound objects move along movement paths that differ depending on steps. This makes it possible to predict the paths along which the sound objects are to move on the basis of the composition to be performed. Thus, by causing the operation object to move so as to make contact with all the sound objects, it is possible to obtain a feeling as if performing the composition.

In addition, the sound objects may move so as to cross the movement-allowed range of the operation object.

On the basis of the above, the sound objects always move toward the inside of the movement-allowed range. This makes it possible to bring the operation object into contact with the sound objects by the operation of waiting for the sound objects in the movement-allowed range.

In addition, a movement-allowed path provided so as to extend in a left-right direction or an up-down direction in a virtual world displayed on the display screen may be set as the movement-allowed range, and the operation object moves along the movement-allowed path. The sound objects may move along a plurality of movement paths orthogonal to the movement-allowed path of the operation object.

On the basis of the above, the movement paths of the sound objects and the movement path of the operation object are orthogonal to each other. This makes it possible to easily predict the positions where the sound objects reach the movement path of the operation object.

In addition, a sound to be output may differ in accordance with a position, in the operation object, with which each sound object has made contact.

On the basis of the above, the sounds to be output differ in accordance with the position, in the operation object, with which the sound objects are brought into contact. This requires not only the operation of simply bringing the objects into contact with each other, but also the operation of adjusting the contact positions, which makes it possible to vary a music game.

In addition, if the sound object has made contact with a first part of the operation object, the sound set for the sound object may be output, and if the sound object has made contact with a second part of the operation object, a sound different from the set sound may be output.

On the basis of the above, the sounds to be output differ in accordance with the parts of the operation object with which the sound objects are brought into contact. This requires the operation of bringing the sound objects into contact with a first part in order to output the set sounds. This makes it possible to vary a music game, and also require the accuracy of the operation.

In addition, if the sound object has made contact with the second part, a sound obtained by changing at least one of three sound elements of the sound set for the sound object may be output.

On the basis of the above, if each sound object has made contact with a second part, a sound obtained by changing at least one of three sound elements of the set sound is output. This makes it possible to achieve a music game where, if the operation has a low accuracy, a sound is generated such that the performance of the composition is shifted from the proper one.

In addition, if the sound object has made contact with the second part, a direction of changing a pitch of a sound may be reversed and/or a direction of changing a loudness of a sound may be reversed from a direction of the contact position relative to the first part, and a sound obtained by changing the pitch and/or the loudness of the sound set for the sound object in the reversed direction may be output.

On the basis of the above, if, as compared to the case where contact is shifted in one direction on the basis of the first part, contact is shifted in the other direction, at least one of the pitch of the sound and the loudness of the sound is changed in the opposite direction. This makes it possible to understand the shifted direction by the output sound, and also reproduce in a more realistic manner the state where the performance of the composition is shifted from the proper one.

In addition, if the sound object has made contact with the second part, an amount of change in a pitch of a sound may be set and/or an amount of change in a loudness of a sound may be set in accordance with a distance between the first part and the contact position, and a sound obtained by changing the pitch and/or the loudness of the sound set for the sound object by the set amount may be output.

On the basis of the above, the amount of change in at least one of the pitch of the sound and the loudness of the sound is changed in accordance with the distance of shift based on the first part. This makes it possible to understand the amount of shift by the output sound, and also reproduce in a more realistic manner the state where the performance of the composition is shifted from the proper one.

In addition, if a direction of a contact position at which the sound object has made contact with the second part is a first direction relative to the first part, a pitch of the sound set for the sound object may be changed so as to become higher in accordance with a distance between the first part and the contact position, and if the direction of the contact position at which the sound object has made contact with the second part is a second direction opposite to the first direction relative to the first part, the pitch of the sound set for the sound object may be changed so as to become lower in accordance with the distance between the first part and the contact position.

On the basis of the above, if contact is shifted in one direction on the basis of the first part, the pitch is changed so as to become higher than the set sound in accordance with the amount of shift, and if contact is shifted in the other direction, the pitch is changed so as to become lower than the set sound in accordance with the amount of shift. This makes it possible to understand the direction of the shift and the amount of shift by the pitch of the output sound, and also reproduce in a more realistic manner the state where the performance of the composition is shifted from the proper one.

In addition, a sound obtained by changing at least one of three sound elements of the sound set for the sound object may be output in accordance with a time when the operation object and the sound object have made contact with each other.

On the basis of the above, a sound obtained by changing at least one of three sound elements of the set sound is output in accordance with the time when the operation object makes contact with each sound object. This makes it possible to achieve a music game where a sound is generated such that the performance of the composition is shifted from the proper one due to a delay in operation timing.

In addition, the game program may further cause the computer to execute evaluating an operation of the user in accordance with a state of contact of the operation object and the sound object. The evaluation may differ in accordance with a time when the operation object and the sound object have made contact with each other.

On the basis of the above, the evaluation of an operation differs in accordance with the time when the operation object makes contact with each sound object. This makes it possible to achieve a game where a delay in operation timing leads to a low evaluation.

In addition, the game program may further cause the computer to execute, on the basis of the received input of the user, determining whether or not the user has provided the input using the input unit. In this case, only while it is determined the user has provided the input, the sound set for the sound object may be output if the operation object and the sound object have made contact with each other.

On the basis of the above, to output sounds set for the respective sound objects, it is necessary to perform an operation constantly. This makes it possible to require the user to perform a continuous operation.

In addition, in a virtual space displayed on the display screen, a movement-allowed path provided on a plane parallel to the display screen may be set as the movement-allowed range, and the operation object may move along the movement-allowed path. The sound objects may move along a plurality of movement paths provided so as to extend in a depth direction in the virtual space.

On the basis of the above, it is possible to achieve a music game where the operation object and the sound objects move in a three-dimensional manner in a virtual space displayed on a display screen.

In addition, the exemplary embodiment may be carried out in the forms of a game apparatus and a game system that include units for performing the above processes, and a game processing method including the above operations performed by the above processes.

On the basis of the exemplary embodiment, an operation object is brought into contact with sound objects that appear in accordance with a composition, whereby sounds set for the respective sound objects are output. This makes it possible to achieve a music game where a user enjoys performing the composition. Further, it is possible to cause the operation object to move in a movement-allowed range so as to make contact with the sound objects, in accordance with an input of the user, and it is possible to output sounds based on the composition merely by placing the operation object at the positions to which the sound objects are to move. This makes it possible to enjoy a music game by an easy operation.

These and other objects, features, aspects and advantages of the exemplary embodiment will become more apparent from the following detailed description of the exemplary embodiment when taken in conjunction with the accompanying drawings.

BRIEF DESCRIPTION OF THE DRAWINGS

FIG. 1 is a block diagram showing a non-limiting example of the configuration of a game apparatus 3 according to an exemplary embodiment;

DETAILED DESCRIPTION OF NON-LIMITING EXAMPLE EMBODIMENTS

Figure 2:
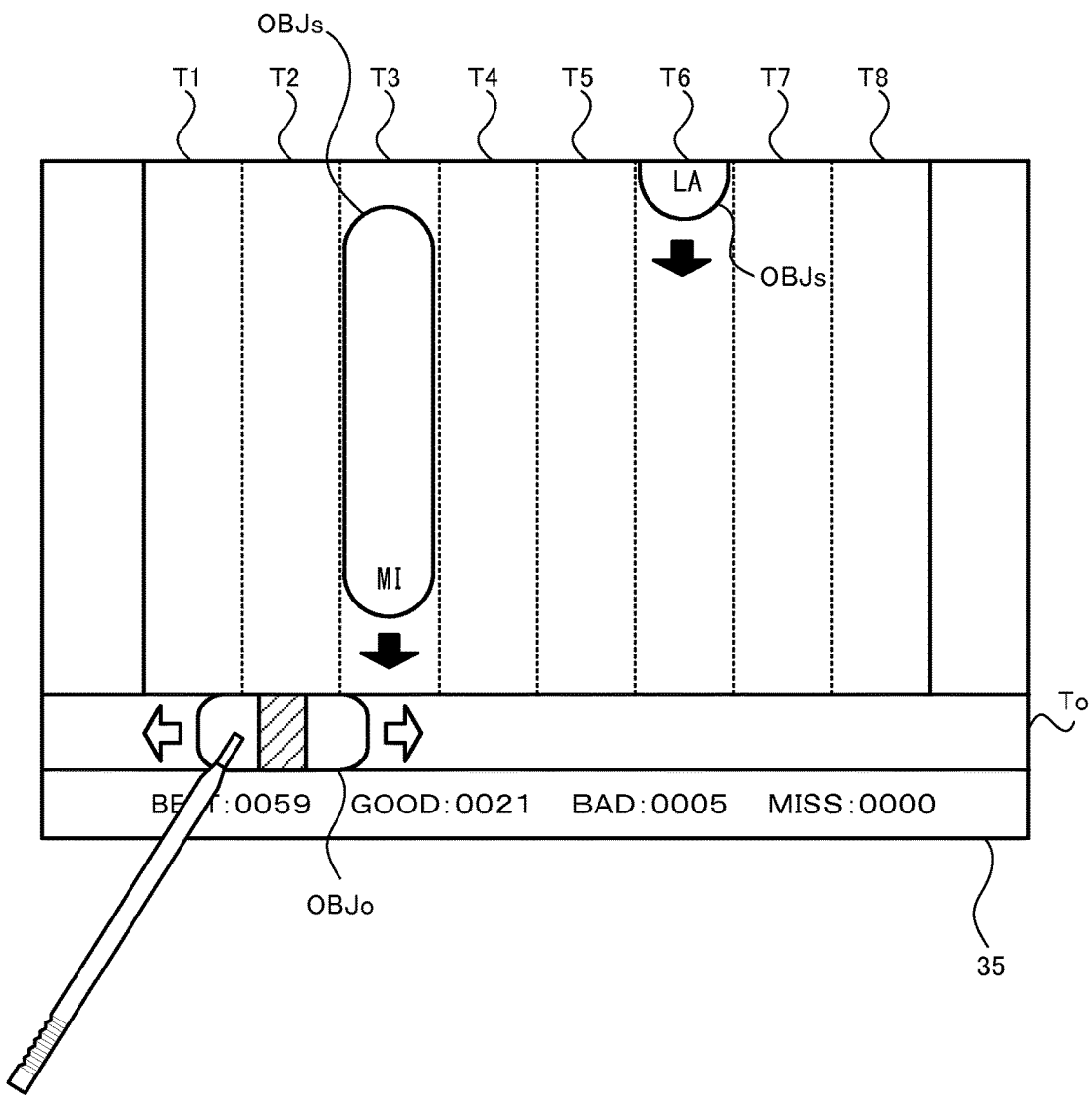
FIG. 2 is a diagram showing a non-limiting example of an image displayed on a display section 35 in the process of outputting sounds in accordance with the contact of an operation object OBJo and sound objects OBJs.

With reference to FIG. 1, a game apparatus according to an exemplary embodiment is described. For example, a game apparatus 3 can execute a game program stored in a storage medium such as an exchangeable optical disk or a memory card, or received from another apparatus. The game apparatus 3 may be a device such as a general personal computer, a stationary game apparatus, a mobile phone, a handheld game apparatus, or a PDA (Personal Digital Assistant). FIG. 1 is a block diagram showing an example of the configuration of the game apparatus 3.

In FIG. 1, the game apparatus 3 includes a control section 31, a storage section 32, a program storage section 33, an input section 34, a display section 35, and a sound output section 36. It should be noted that the game apparatus 3 may include one or more apparatuses containing: an information processing apparatus having at least the control section 31; and another apparatus.

The control section 31 is information processing means (a computer) for performing various types of information processing, and is, for example, a CPU. The control section 31 has the functions of performing as the various types of information processing processing based on the operation performed on the input section 34 by a user; and the like. The above functions of the control section 31 are achieved, for example, as a result of the CPU executing a predetermined program.

The storage section 32 stores various data to be used when the control section 31 performs the above information processing. The storage section 32 is, for example, a memory accessible by the CPU (the control section 31).

The program storage section 33 stores a program. The program storage section 33 may be any storage device (storage medium) accessible by the control section 31. For example, the program storage section 33 may be a storage device provided in the game apparatus 3 having the control section 31, or may be a storage medium detachably attached to the game apparatus 3 having the control section 31. Alternatively, the program storage section 33 may be a storage device (a server or the like) connected to the control section 31 via a network. The control section 31 (the CPU) may read some or all of the program to the storage section 32 at appropriate timing, and execute the read program.

The input section 34 is an input apparatus that can be operated by the user. The input section 34 may be any input apparatus. For example, the input section 34 has a touch panel 341. The touch panel 341 detects the position of the input provided to a predetermined input surface (a display screen of the display section 35). Further, the game apparatus 3 may include an operation section such as a slide pad, an analog stick, a directional pad, and an operation button as the input section 34.

The display section 35 displays an image in accordance with an instruction from the control section 31.

The sound output section 36 outputs a sound in accordance with an instruction from the control section 31.

Figure 3:
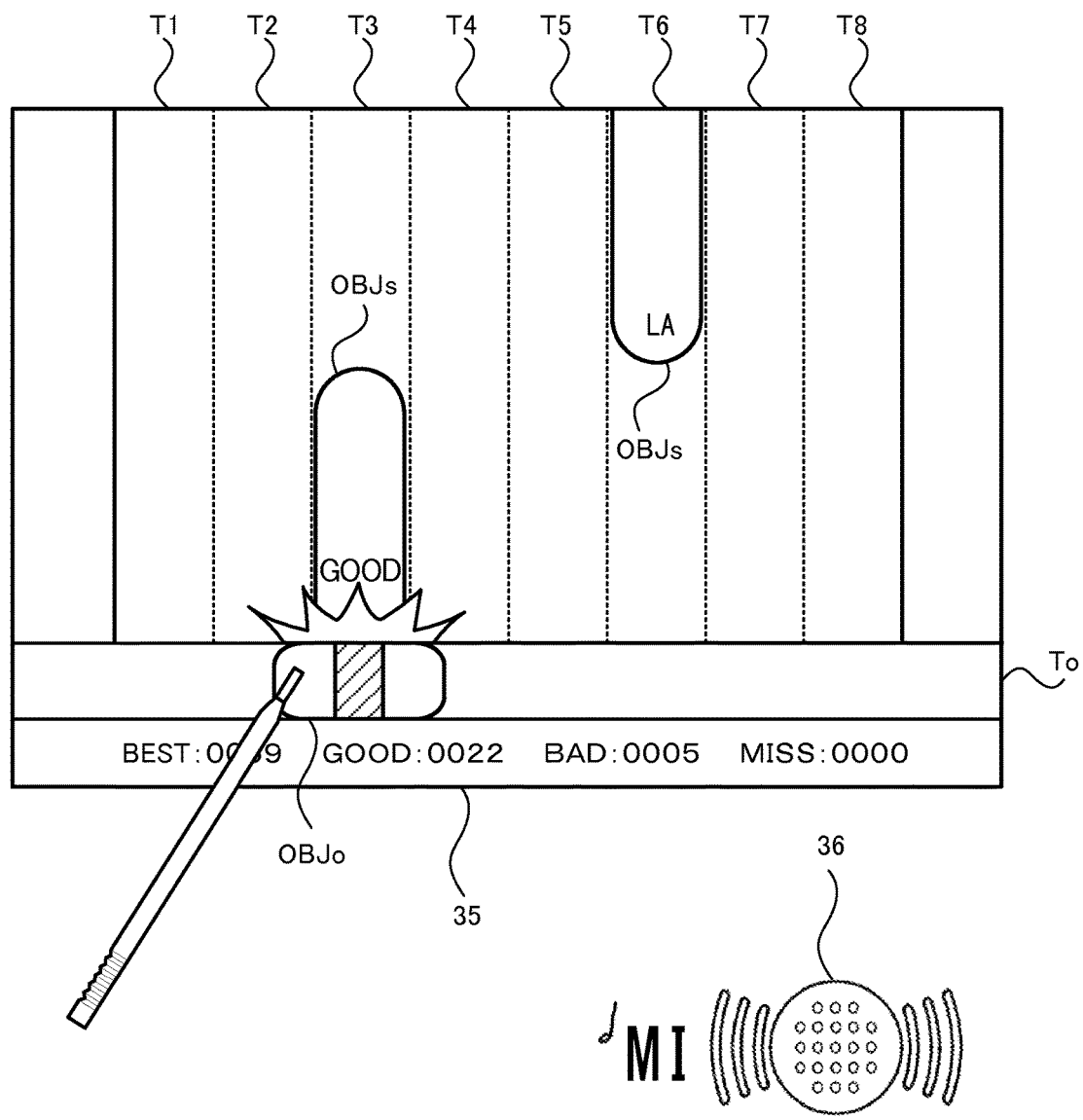
FIG. 3 is a diagram showing a non-limiting example of an image displayed on the display section 35 in the process of outputting sounds in accordance with the contact of the operation object OBJo and the sound objects OBJs.
Figure 4:
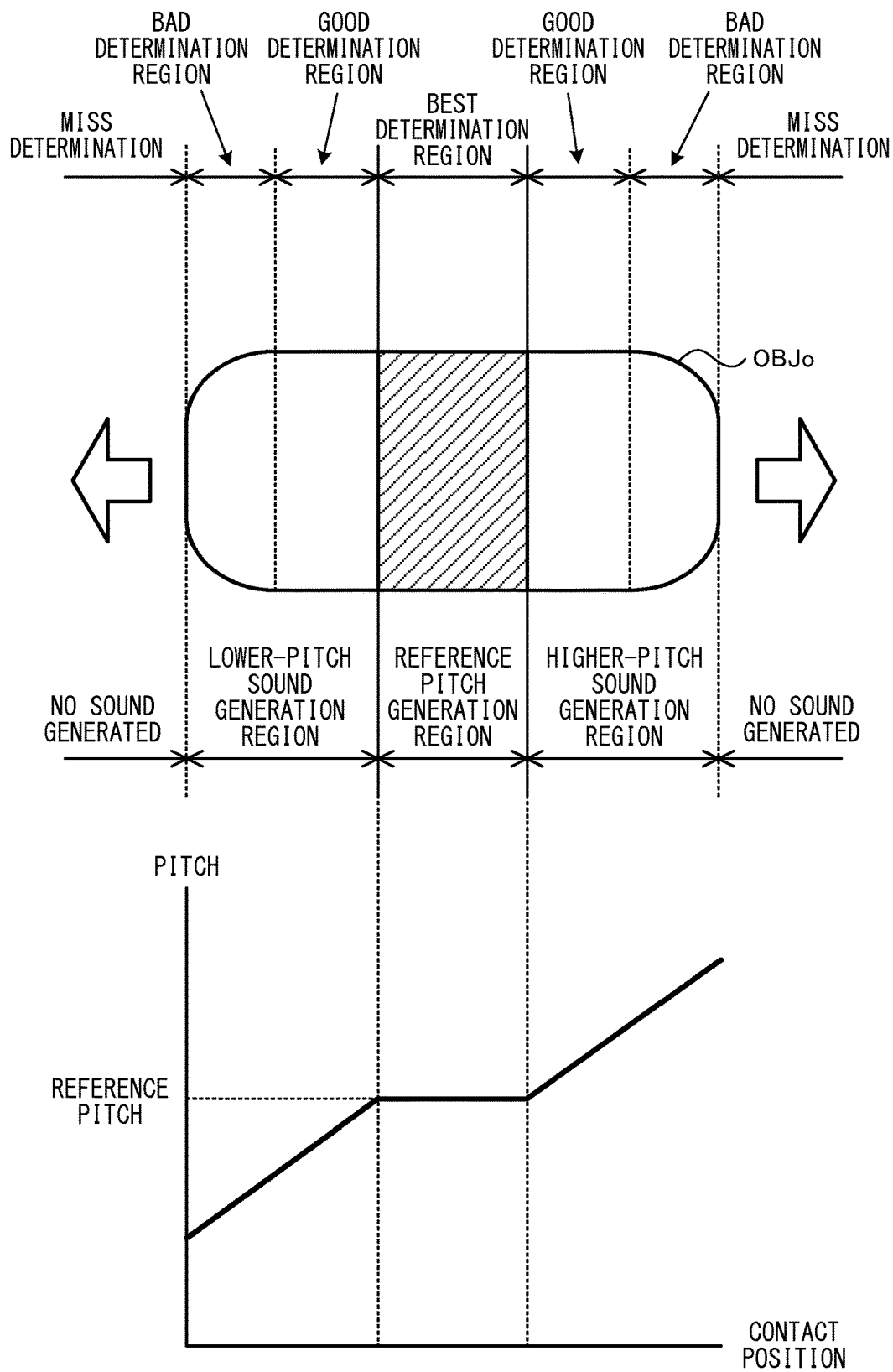
FIG. 4 is a diagram showing a non-limiting example of the specification of the operation object OBJo.
Figure 5:
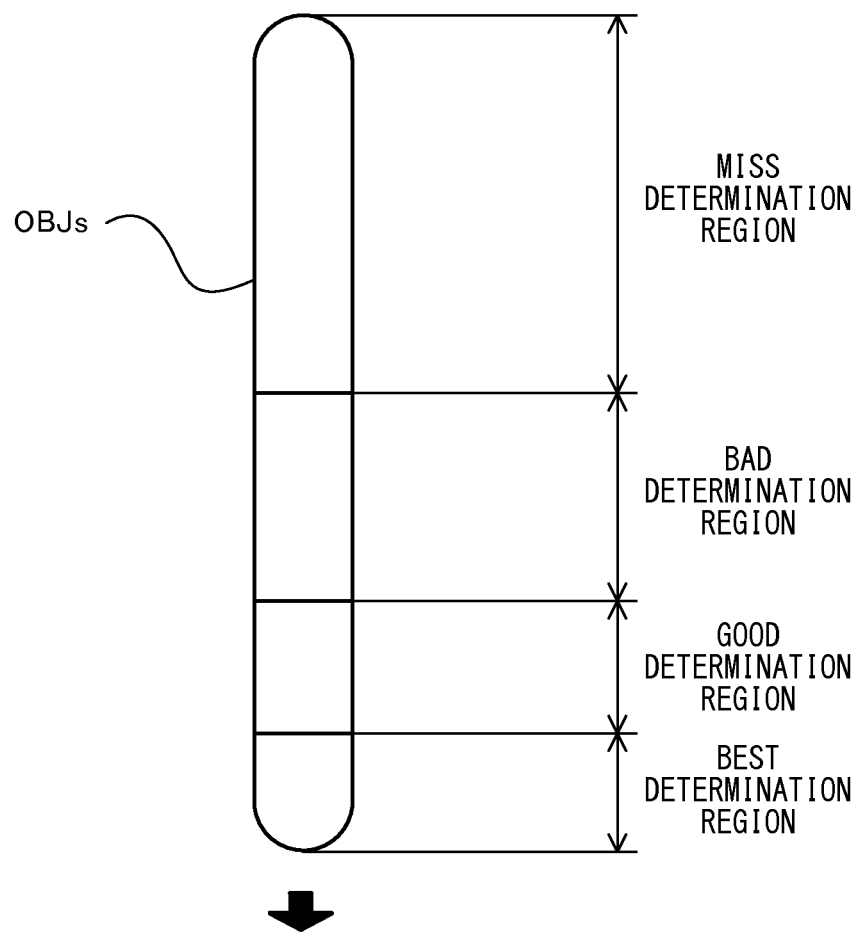
FIG. 5 is a diagram showing a non-limiting example of the specification of each sound object OBJs.
Figure 6:
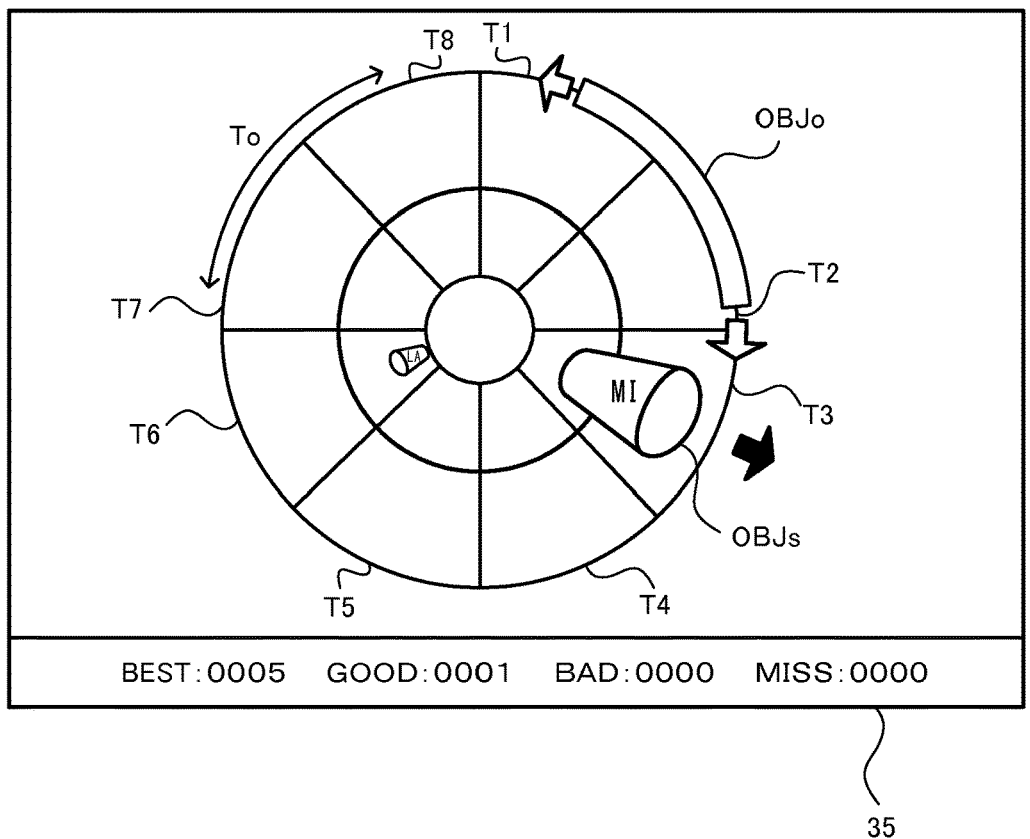
FIG. 6 is a diagram showing another non-limiting example of the image displayed on the display section 35 in the process of outputting sounds in accordance with the contact of the operation object OBJo and the sound objects OBJs.

Next, with reference to FIGS. 2 through 6, a description is given of an overview of the processing performed by the game apparatus 3, before the description of specific processing performed by the game apparatus 3. It should be noted that the following descriptions are given taking as an example the process of outputting sounds in accordance with the contact of an operation object OBJo and sound objects OBJs. Further, FIGS. 2 and 3 are diagrams showing an example of an image displayed on the display section 35 in the process of outputting sounds in accordance with the contact of the operation object OBJo and the sound objects OBJs. FIG. 4 is a diagram showing an example of the specification of the operation object OBJo. FIG. 5 is a diagram showing an example of the specification of each sound object OBJs. FIG. 6 is a diagram showing another example of the image displayed on the display section 35 in the process of outputting sounds in accordance with the contact of the operation object OBJo and the sound objects OBJs.

As shown in FIG. 2, a virtual world including an operation object OBJo and sound objects OBJs is displayed on the display section 35. The operation object OBJo moves in accordance with a touch operation on the touch panel 341. For example, the operation object OBJo is allowed to move along a movement path To provided so as to extend in a left-right direction in the virtual world (the directions indicated by outline arrows shown in FIG. 2), and moves to the position, on the movement path To, overlapping the touch position of a touch operation on the touch panel 341. Further, the plurality of sound objects OBJs, set for respective steps at which sounds are output, appear in the virtual world, and each sound object OBJs moves toward the movement path To. For example, the sound objects OBJs appear so as to be timed to the sounds to be output at the respective steps in accordance with a composition to be performed, and move along a plurality of movement paths T1 through T8 provided so as to extend in an up-down direction in the virtual world. As an example, as shown in FIG. 2, the movement path To is provided in a lower portion of the display section 35 so as to extend in the left-right direction, and the movement paths T1 through T8 are arranged next to each other so as to extend in the up-down direction and cross the movement path To from thereabove. In this case, the sound objects OBJs appear from above any of the movement paths T1 through T8, and move downward (that is, toward the movement path To; in the directions indicated by filled arrows shown in FIG. 2) along the movement paths T1 through T8. It should be noted that the movement paths T1 through T8 are set for respective steps at which sounds are output, so that the sound objects OBJs move along the movement paths T1 through T8 based on the steps set for the respective sound objects OBJs.

As shown in FIG. 3, if the operation object OBJo and each moving sound object OBJs have made contact with each other, a sound based on the step set for the sound object OBJs is output from the sound output section 36. For example, in the example of FIG. 3, the sound object OBJs for which the step "mi" is set and which moves along the movement path T3 makes contact with the operation object OBJo, and as a result, the step "mi" set for the sound object OBJs having made the contact is output from the sound output section 36. Thus, the user of the game apparatus 3 causes the operation object OBJo to move so as to make contact with each moving sound object OBJs, and thereby can output a sound at the step set for the sound object OBJs with which the operation object OBJo has made contact. Then, the sound objects OBJs appear in accordance with a composition to be performed, so that the user can listen to the sound of the composition by bringing the operation object OBJo into contact with all the sound objects OBJs having appeared.

As shown in FIG. 4, the operation object OBJo is formed of a plurality of parts that, if having made contact with each sound object OBJs, result in the output of different sounds. For example, in the operation object OBJo, a reference pitch generation region is provided in the center in the moving direction (the left-right direction), a higher-pitch sound generation region is provided to the right of the reference pitch generation region (at the right end), and a lower-pitch sound generation region is provided to the left of the reference pitch generation region (at the left end).

The reference pitch generation region is a part that, if having made contact with each sound object OBJs, results in the output of a sound at the step set for the sound object OBJs (a reference pitch) as it is from the sound output section 36. In contrast, the higher-pitch sound generation region is a part that, if having made contact with each sound object OBJs, results in the output of a sound at a pitch higher than the reference pitch set for the sound object OBJs from the sound output section 36. Specifically, as shown in FIG. 4, if each sound object OBJs has made contact with the higher-pitch sound generation region, the sound to be output from the sound output section 36 is adjusted such that the pitch becomes higher by gradually increasing from the reference pitch in a linear manner in accordance with the distance between the reference pitch generation region and the contact position. On the other hand, the lower-pitch sound generation region is a part that, if having made contact with each sound object OBJs, results in the output of a sound at a pitch lower than the reference pitch set for the sound object OBJs from the sound output section 36. Specifically, as shown in FIG. 4, if each sound object OBJs has made contact with the lower-pitch sound generation region, the sound to be output from the sound output section 36 is adjusted such that the pitch becomes lower by gradually decreasing from the reference pitch in a linear manner in accordance with the distance between the reference pitch generation region and the contact position. It should be noted that, if each sound object OBJs has not made contact with the operation object OBJo, a sound at the step set for the sound object OBJs is not output from the sound output section 36 ("No sound generated" shown in FIG. 4).

In addition, the operation object OBJo is formed also of a plurality of parts that, if having made contact with each sound object OBJs, result in the determination of different points. For example, in the operation object OBJo, a BEST determination region is provided in the center in the moving direction (the left-right direction). Further, GOOD determination regions are provided to both sides of the BEST determination region, and BAD determination regions are provided outside the respective GOOD determination regions (at both ends of the operation object OBJo).

The BEST determination region is typically a part that is provided as the same region as the reference pitch generation region, and that, if each sound object OBJs has made contact with the BEST determination region first, results in the highest evaluation point (BEST). The GOOD determination regions are parts that, if each sound object OBJs has made contact with either one of the GOOD determination regions first, result in the second highest evaluation point (GOOD). Further, the BAD determination regions are parts that, if each sound object OBJs has made contact with either one of the BAD determination regions first, result in the lowest evaluation point (BAD). It should be noted that, if each sound object OBJs has not made contact with the operation object OBJo, a miss evaluation (MISS) is determined, and a point based on the miss evaluation is added.

It should be noted that the exemplary embodiment is described above using the example where sounds and points vary in accordance with the part of the operation object OBJo having made contact with each sound object OBJs. Alternatively, sounds and points may vary in accordance with the part of each sound object OBJs having made contact with the operation object OBJo. For example, as shown in FIG. 5, each sound object OBJs is formed of a plurality of parts that, if having made contact with the operation object OBJo, result in the determination of different points. For example, in each sound object OBJs, a BEST determination region is provided at the front in the moving direction (the downward direction indicated by a filled arrow). Further, a GOOD determination region is provided adjacent to the rear of the BEST determination region in the moving direction. Furthermore, a BAD determination region is provided adjacent to the rear of the GOOD determination region in the moving direction. Furthermore, a MISS determination region is provided adjacent to the rear of the BAD determination region in the moving direction.

The BEST determination region of the sound object OBJs is also set as a part that, if the operation object OBJo has made contact with the BEST determination region first, results in the highest evaluation point (BEST). The GOOD determination region of the sound object OBJs is also set as a part that, if the operation object OBJo has made contact with the GOOD determination region first, results in the second highest evaluation point (GOOD). The BAD determination region of the sound object OBJs is also set as a part that, if the operation object OBJo has made contact with the BAD determination region first, results in the third highest evaluation point (BAD). Then, the MISS determination region of the sound object OBJs is set such that, even if the operation object OBJo has made contact with the MISS determination region first, a miss evaluation (MISS) is determined. Thus, the MISS determination region is set as a part that results in the addition of a point based on the miss evaluation, or is set as a pointless part.

As described above, each sound object OBJs is formed of a plurality of parts that, if the operation object OBJo has made contact with them first, result in the determination of different points. Thus, even if the operation object OBJo has been brought into contact with each sound object OBJs, the determination of different points is made depending on the time when the objects are brought into contact with each other. Specifically, in the exemplary embodiment described above, the parts are arranged next to each other in descending order of evaluation, starting from the front of the sound object OBJs in the moving direction. Thus, the earlier the user brings the operation object OBJo into contact with each moving sound object OBJs, the higher evaluation (the higher point of the game score) they obtain. It should be noted that the determination regions described above may be set not only in either of the operation object OBJo and the sound objects OBJs, but also in both the operation object OBJo and the sound objects OBJs. In this case, the evaluation (a point of the game score) may be determined in accordance with the combination of both determination regions having made contact with each other.

In addition, similarly to the determination regions formed in each sound object OBJs for the determination of a point, a plurality of parts that, if having made contact with the operation object OBJo, result in the output of different sounds may be formed in the sound object OBJs. As an example, in each sound object OBJs, a reference pitch generation region, a higher-pitch sound generation region or a lower-pitch sound generation region, and a no-sound generation region are provided, starting from the front of the sound object OBJs in the moving direction. Then, if the operation object OBJo has made contact with the reference pitch generation region of each sound object OBJs first, a sound at the step set for the sound object OBJs (a reference pitch) is output as it is from the sound output section 36. Further, if the operation object OBJo has made contact with the higher-pitch sound generation region or the lower-pitch sound generation region of each sound object OBJs first, a sound at the pitch higher or lower than the reference pitch set for the sound object OBJs in accordance with the distance from the front is output from the sound output section 36. Then, if the operation object OBJo has made contact with the no-sound generation region of each sound object OBJs first, a sound at the step set for the sound object OBJs is not output from the sound output section 36.

As described above, each sound object OBJs is formed of a plurality of parts that, if the operation object OBJo has made contact with them first, result in the output of sounds at different pitches or do not result in the output of any sound. Thus, even if the operation object OBJo has been brought into contact with each sound object OBJs, different sounds are output, or no sound is output, depending on the time when the objects are brought into contact with each other. For example, in the exemplary embodiment described above, the parts are arranged next to each other in descending order such that the closer to the front of each sound object OBJs in the moving direction, the closer to the step set for the sound object OBJs the sound to be output. Thus, the earlier the user brings the operation object OBJo into contact with each moving sound object OBJs, the closer to the set step the sound they can listen to. It should be noted that the generation regions described above may be set not only in either of the operation object OBJo and the sound objects OBJs, but also in both the operation object OBJo and the sound objects OBJs. In this case, a sound may be output in accordance with the combination of both generation regions having made contact with each other.

It should be noted that, in the exemplary game described above, the movement path To of the operation object OBJo is provided in the lower portion of the display section 35 so as to extend in the left-right direction, while the movement paths T1 through T8 of the sound objects OBJs are provided so as to extend in the up-down direction. Alternatively, the virtual world may be formed on the basis of another placement relationship so long as the movement path of the operation object OBJo is provided so as to cross the movement paths of the sound objects OBJs. For example, the plurality of movement paths of the sound objects OBJs may be arranged next to each other so as to extend in the left-right direction, and the movement path of the operation object OBJo may be provided so as to extend in the up-down direction, such that the movement paths of the sound objects OBJs are orthogonal to the movement path of the operation object OBJo. Alternatively, the plurality of movement paths of the sound objects OBJs may be provided so as to cross the movement path of the operation object OBJo at various angles. Yet alternatively, the movement paths of the sound objects OBJs and the movement path of the operation object OBJo may be provided so as to cross each other not on a two-dimensional plane but in a three-dimensional manner in a virtual space. With reference to FIG. 6, a description is given below of an example where the movement paths of the sound objects OBJs and the movement path of the operation object OBJo are provided so as to cross each other in a stereoscopically viewable virtual space.

As shown in FIG. 6, a virtual space including an operation object OBJo and sound objects OBJs is displayed on the display section 35 as a stereoscopic image or as a planar image that is not stereoscopically viewable. Here, the display of a stereoscopic image is performed as follows. A left-eye image and a right-eye image that differ depending on the parallax are displayed using substantially the same display area, thereby displaying a three-dimensional image (a stereoscopically viewable image) having a stereoscopic effect to the user, and displaying an image as if the objects are present in the depth direction of the screen. Further, the display of a planar image means the display of an image that is planar, as opposed to the term "stereoscopic" described above. The display of a planar image is the same as the display of a stereoscopic image in that the virtual space is displayed; however, the display of a planar image is performed such that the same displayed image is viewable to both the left eye and the right eye. In the virtual space, a three-dimensional cylinder is placed, whose cylindrical axis is directed in the depth direction of the screen. Then, a plurality of movement paths T1 through T8 of the sound objects OBJs are arranged next to each other so as to extend in the direction of the axis and along the inner surface of the cylinder. Further, a movement path To of the operation object OBJo is provided in a circular manner on the end surface of the cylinder (at the circular end of the cylinder) formed on the closer side in the depth direction of the screen.

In the example shown in FIG. 6, on the inner surface of the cylinder, the sound objects OBJs appear at the end of the cylinder on the further side in the depth direction of the screen, and then move along the movement paths T1 through T8 toward the closer side in the depth direction of the screen. On the other hand, the operation object OBJo moves along the movement path To in accordance with the operation on the touch panel 341 or an analog stick (an input apparatus that allows an input of a direction by inclining or sliding its member relative to a base point). For example, in the case of the operation using the analog stick, the operation object OBJo is caused to move to a position, on the movement path To, corresponding to the direction indicated by the analog stick with respect to the center of the circular movement path To (the axis of the cylinder). Then, if the operation object OBJo has made contact with each moving sound object OBJs, a sound based on the step set for the sound object OBJs is output from the sound output section 36, as in the music game described with reference to FIGS. 2 and 3.

In addition, the above descriptions are given using the example where the operation object OBJo is configured to move along the linear circular movement path To or the circular movement path To. Alternatively, the operation object OBJo may be configured to move in a predetermined range. In this case, the operation object OBJo can freely move, in accordance with a user operation, not only on a straight line or a curved line but also on a plane set as a movement-allowed range, which enables a music game with a higher degree of freedom.

In addition, the above descriptions are given using the example where the movement paths T1 through T8 along which the sound objects OBJs move are set for respective steps. Alternatively, one movement path may be set for a plurality of steps. Yet alternatively, movement paths may be set independently of steps, in which case the sound objects OBJs, for which respective steps are set, may be configured to move along the movement paths in a random manner.

In addition, the example is used where, if each sound object OBJs has made contact with the higher-pitch sound generation region or the lower-pitch sound generation region, the sound to be output from the sound output section 36 is adjusted such that the pitch becomes higher by gradually increasing from the reference pitch in a linear manner, or becomes lower by gradually decreasing from the reference pitch in a linear manner, in accordance with the distance between the reference pitch generation region and the contact position. Alternatively, another form of change may be made in the sound if the contact position is included in the higher-pitch sound generation region or the lower-pitch sound generation region. For example, the sound to be output from the sound output section 36 may be adjusted such that the pitch becomes higher by gradually increasing from the reference pitch in a stepwise manner, or becomes lower by gradually decreasing from the reference pitch in a stepwise manner, in accordance with the distance between the reference pitch generation region and the contact position.

In addition, if each sound object OBJs has made contact with a region different from the reference pitch generation region of the operation object OBJo (the higher-pitch sound generation region or the lower-pitch sound generation region in FIG. 4), a parameter different from the pitch of the sound set for the sound object OBJs may be changed. For example, at least one of three sound elements (the loudness of the sound, the pitch of the sound, and the quality (timbre) of the sound) of the sound set for the sound object OBJs may be changed. In this case, the amount of change in at least one of the three sound elements may be changed in a gradually increasing manner or in a gradually decreasing manner in accordance with the distance between the reference pitch generation region and the contact position. Alternatively, if each sound object OBJs has made contact with a region different from the reference pitch generation region of the operation object OBJo, a sound unrelated to the sound set for the sound object OBJs may be output. For example, if each sound object OBJs has made contact with such a region, an electronic sound fixed in advance (for example, a beeping sound) may be output.

In addition, the above descriptions are given using the example where the operation object OBJo moves in accordance with the operation on the touch panel 341 or the analog stick; however, input means for causing the operation object OBJo to move is not limited to these. As a first example, the operation object OBJo may be caused to move along the movement path in accordance with the position indicated by another pointing device for designating a position on the screen. Here, the pointing device is input apparatus for designating an input position or coordinates on the screen, and the input apparatus is achieved by, as well as the touch panel 341, a system in which a mouse, a trackpad, or a trackball is used to designate a position on the screen, or a game controller is pointed to the screen, thereby detecting a specific position in the screen. As a second example, the operation object OBJo may be caused to move along the movement path in accordance with the direction corresponding to the pressing of a directional pad. As a third example, a button for making a movement in the forward direction of the movement path and another button for making a movement in the opposite direction of the movement path may be set, so that the operation object OBJo is caused to move along the movement path in accordance with the pressed button. As a fourth example, an input apparatus may be used on which at least part of the user's body is placed to detect the load value of the placed part and the position of the center of gravity of the placed part, so that the operation object OBJo is caused to move along the movement path in accordance with a change in the load value or a shift in the position of the center of gravity.

In addition, to adjust the level of difficulty in a music game, generally, the moving speed of the sound objects OBJs may be adjusted, or the number of the sound objects OBJs to appear may be adjusted. In the music game described above, however, it is possible to easily adjust the level of difficulty in the game by another method as well. For example, it is possible to adjust the level of difficulty in the game by making at least one of the following changes: increasing or decreasing the number of the movement paths along which the sound objects OBJs are allowed to move; increasing or decreasing the range in which the movement paths of the sound objects OBJs and the movement path of the operation object OBJo cross each other; increasing or decreasing the size of the operation object OBJo; increasing or decreasing the size of the reference pitch generation region (the BEST determination region); and the like.

Next, a detailed description is given of the processing performed by the game apparatus 3. First, with reference to FIG. 7, main data used in the processing is described. It should be noted that FIG. 7 is a diagram showing examples of main data and programs stored in the storage section 32 of the game apparatus 3.

Figure 7:
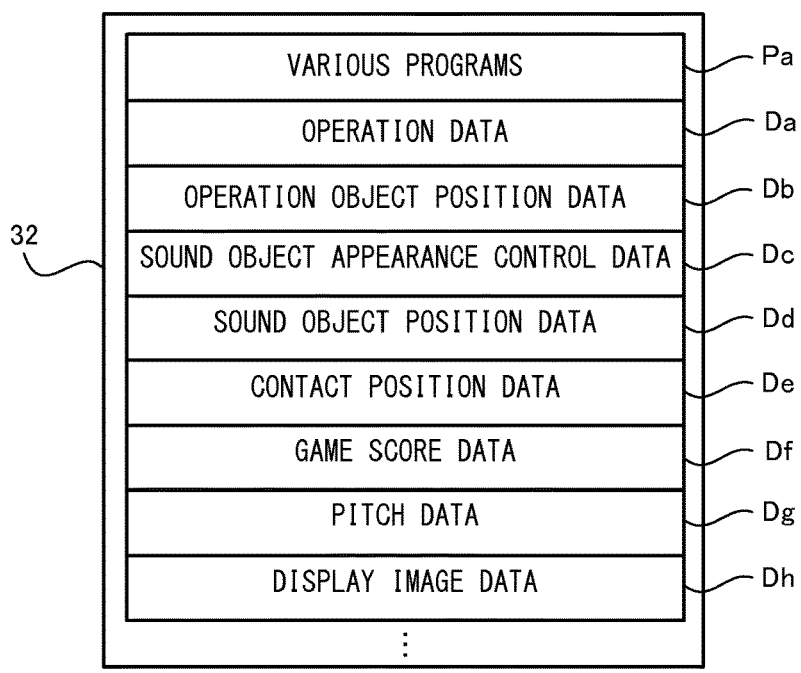
FIG. 7 is a diagram showing non-limiting examples of main data and programs stored in a storage section 32 of the game apparatus 3.

As shown in FIG. 7, the following are stored in the data storage area of the storage section 32: operation data Da; operation object position data Db; sound object appearance control data Dc; sound object position data Dd; contact position data De; game score data Df; pitch data Dg; display image data Dh; and the like. It should be noted that the storage section 32 may store, as well as the data shown in FIG. 7, data and the like necessary for the processing, such as data used in an application to be executed. Further, in the program storage area of the storage section 32, various programs Pa included in the game program are stored.

The operation data Da is data representing the content of the operation performed on the input section 34, and includes data representing the touch position of a touch operation on the touch panel 341.

The operation object position data Db is data representing the position of the operation object OBJo in the virtual world.

The sound object appearance control data Dc is data for setting the types and the shapes of the sound objects OBJs to appear, and the time of the appearance, the movement path, the moving speed, and the like of each sound object OBJs, in order to perform the control of causing the sound objects OBJs to appear and move in the virtual world.

The sound object position data Dd is data representing the positions of the sound objects OBJs in the virtual world.

The contact position data De is data representing the position, in the operation object OBJo, with which each sound object OBJs has made contact.

The game score data Df is data representing the point of the score with respect to each evaluation rank, the point being added in accordance with the contact position, in the operation object OBJo, with which each sound object OBJs has made contact.

The pitch data Dg is data representing the pitch set in accordance with the type of each sound object OBJs having made contact with the operation object OBJo and in accordance with the contact position.

The display image data Dh is data for generating an image in which virtual objects, backgrounds, and the like such as the operation object OBJo and the sound objects OBJs are placed, and displaying the image on the display section 35.

Figure 8:
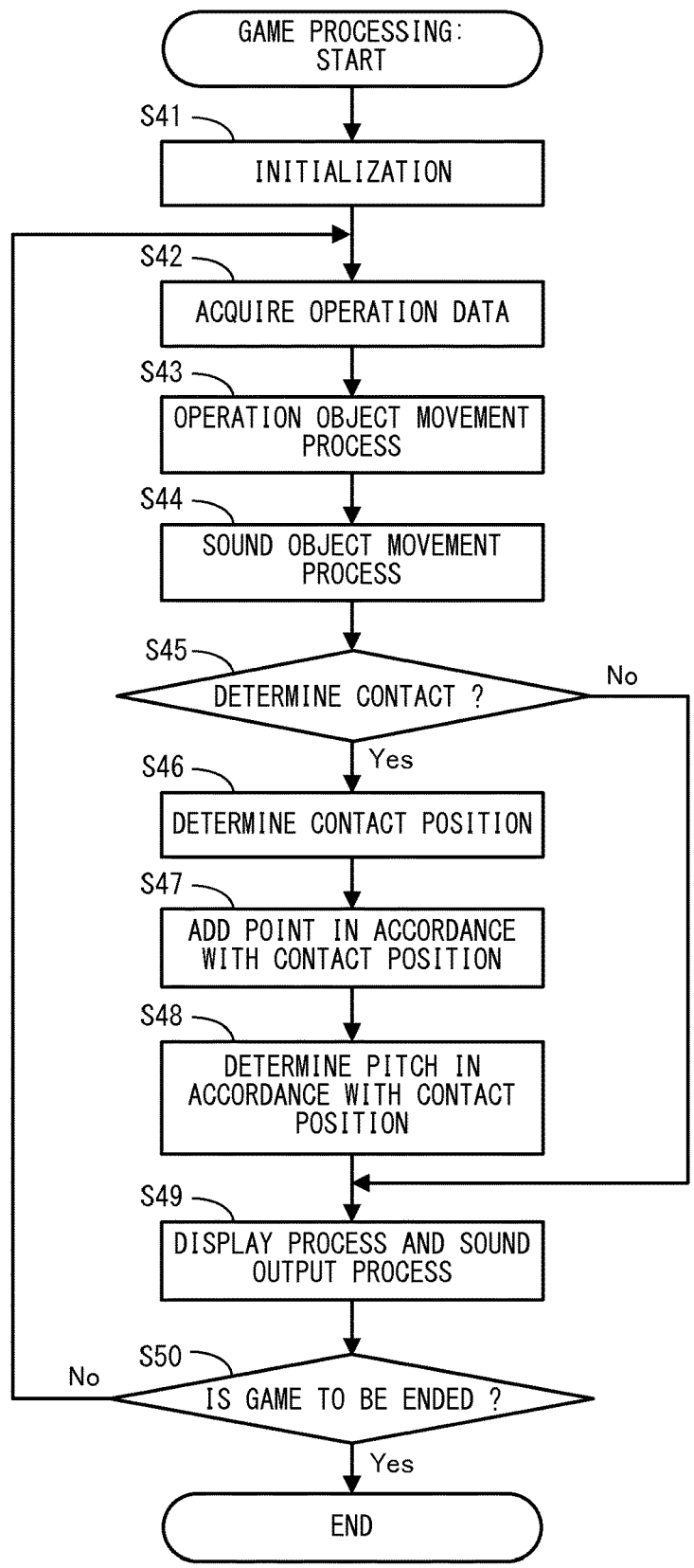
FIG. 8 is a flow chart showing a non-limiting example of the game processing performed by the game apparatus 3.

Next, with reference to FIG. 8, a detailed description is given of the game processing performed by the game apparatus 3. It should be noted that FIG. 8 is a flow chart showing an example of the game processing performed by the game apparatus 3. Here, in the flow chart shown in FIG. 8, descriptions are given mainly of, in the processing performed by the game apparatus 3, the process of outputting sounds based on the states of the contact of the sound objects OBJs and the operation objects OBJo. The detailed descriptions of other processes not directly related to these processes are omitted. Further, in FIG. 8, all the steps performed by the control section 31 are abbreviated as "S".

The CPU of the control section 31 initializes a memory and the like of the storage section 32, and loads the game program from the program storage section 33 into the memory. Then, the CPU starts the execution of the game program. The flow chart shown in FIG. 8 is a flow chart showing the processing performed after the above processes are completed.

It should be noted that the processes of all the steps in the flow chart shown in FIG. 8 are merely illustrative. Thus, the processing order of the steps may be changed, or another process may be performed in addition to and/or instead of the processes of all the steps, so long as similar results are obtained. Further, in the exemplary embodiment, descriptions are given on the assumption that the control section 31 (the CPU) performs the processes of all the steps in the flow chart. Alternatively, a processor or a dedicated circuit other than the CPU may perform the processes of some or all of the steps in the flow chart.

Referring to FIG. 8, the control section 31 performs initialization (step 41), and proceeds to the subsequent step. For example, the control section 31 constructs a virtual world to be displayed on the display section 35, and initializes parameters. As an example, the control section 31 sets a composition to be performed in a game performed in the following processes, and sets the sound object appearance control data Dc for the plurality of sound objects OBJs set for respective sounds to be output in accordance with the composition.

Next, the control section 31 acquires operation data from the input section 34, updates the operation data Da (step 42), and proceeds to the subsequent step.

Next, in accordance with the operation data acquired in the above step 42, the control section 31 performs the process of causing the operation object OBJo to move (step 43), and proceeds to the subsequent step. For example, if the operation data indicates that a touch operation has been performed on the movement path To, the control section 31 calculates the position of the operation object OBJo so as to overlap the position, on the movement path To, overlapping the touch position on which the touch operation has been performed, or so as to approach the overlapping position at a predetermined speed, and updates the operation object position data Db using the calculated position. It should be noted that, if the operation data indicates a touch position performed not on the movement path To, or indicates a touch-off state (that is, a touch operation has not been performed), the control section 31 maintains the position of the operation object OBJo represented by the operation object position data Db, and proceeds to the subsequent step.

Next, the control section 31 performs the process of causing the sound objects OBJs to appear, move, or disappear (step 44), and proceeds to the subsequent step. For example, on the basis of the sound object appearance control data Dc, the control section 31 performs: the process of causing the sound objects OBJs to appear in the virtual world; the process of causing the sound objects OBJs placed in the virtual world to move; the process of causing the sound objects OBJs to disappear from the virtual world; or the like. Then, in accordance with the result of the process, the control section 31 calculates the position of each sound object OBJs, and updates the sound object position data Dd using the calculated position.

Next, the control section 31 determines whether or not it is the time to determine the contact of the sound objects OBJs and the operation object OBJo (step 45). For example, if at least one of the sound objects OBJs placed in the virtual world is present on the movement path To of the operation object OBJo, the control section 31 determines that it is the time to determine the contact. Then, if it is the time to determine the contact, the control section 31 proceeds to step 46. If, on the other hand, it is not the time to determine the contact, the control section 31 proceeds to step 49.

In step 46, the control section 31 determines the contact position, in the operation object OBJo, with which the sound object OBJs has made contact, and proceeds to the subsequent step. For example, the control section 31 calculates the position, in the operation object OBJo, with which the sound object OBJs has made contact (for example, the distance between the center of the operation object OBJo and the center of the sound object OBJs on which the determination is being made), and updates the contact position data De using the calculated position.

Next, the control section 31 adds a point in the game (a point of the game score) in accordance with the contact position (step 47), and proceeds to the subsequent step. For example, the control section 31 determines the part of the operation object OBJo and the part of the sound object OBJs having made contact with each other first, adds an evaluation point based on the determined parts, and updates the game score data Df. For example, if determining an evaluation point using the determination regions set in the operation object OBJo (the BEST determination region, the GOOD determination region, and the BAD determination region; see FIG. 4), the control section 31 determines the determination region of the operation object OBJo in which the operation object OBJo and the sound object OBJs have make contact with each other first, adds an evaluation point based on the determined region (that is, the BEST evaluation point, the GOOD evaluation point, or the BAD evaluation point), and updates the game score data Df. Alternatively, if determining an evaluation point using the determination regions set in the sound object OBJs (the BEST determination region, the GOOD determination region, the BAD determination region, and the MISS determination region; see FIG. 5), the control section 31 determines the determination region of the sound object OBJs in which the operation object OBJo and the sound object OBJs have made contact with each other first, adds an evaluation point based on the determined region (that is, the BEST evaluation point, the GOOD evaluation point, the BAD evaluation point, or the MISS evaluation point), and updates the game score data Df. It should be noted that, if in the touch-off state (that is, the state where a touch operation has not been performed on the touch panel 341), the control section 31 may determine, even if the contact position indicates that the operation object OBJo and the sound object OBJs have made contact with each other, that the operation object OBJo has not made contact with the sound object OBJs. Further, if one of the sound objects OBJs has passed through the movement path To of the operation object OBJo without making contact with the operation object OBJo, the control section 31 adds a miss evaluation point (that is, the MISS evaluation point), and updates the game score data Df.

Next, the control section 31 determines a pitch in accordance with the contact position (step 48), and proceeds to step 49. For example, on the basis of the contact position, the control section 31 determines the sound generation region, of the operation object OBJo, with which the sound object OBJs has made contact (the reference pitch generation region, the higher-pitch sound generation region, or the lower-pitch sound generation region; see FIG. 4), determines a pitch in accordance with the determined region, and updates the pitch data Dg. For example, if the sound object OBJs has made contact with the reference pitch generation region, the control section 31 updates the pitch data Dg using the reference pitch set for the sound object OBJs. Alternatively, if the sound object OBJs has made contact with the higher-pitch sound generation region, the control section 31 determines a pitch by gradually heightening the reference pitch set for the sound object OBJs, in accordance with the distance between the contact position and the reference pitch generation region, and updates the pitch data Dg using the determined pitch. Yet alternatively, if the sound object OBJs has made contact with the lower-pitch sound generation region, the control section 31 determines a pitch by gradually lowering the reference pitch set for the sound object OBJs, in accordance with the distance between the contact position and the reference pitch generation region, and updates the pitch data Dg using the determined pitch. It should be noted that, if the contact position indicates that the operation object OBJo has not made contact with the sound object OBJs, or indicates the touch-off state, the control section 31 updates the pitch data Dg using data indicating that no sound is generated (for example, Null). Further, on the basis of the contact position, the control section 31 may determine the sound generation region, of the sound object OBJs (the reference pitch generation region, the higher-pitch sound generation region, the lower-pitch sound generation region, or the no-sound generation region), with which the operation object OBJo has made contact first, and may determine a pitch in accordance with the determined region. In this case, the pitch to be set on the basis of the contact with the sound object OBJs after the confirmation of the contact with the operation object OBJo may be determined by changing the pitch determined on the basis of the first contact with the operation object OBJo, or may be determined by maintaining the pitch determined on the basis of the first contact with the operation object OBJo as it is.

In step 49, the control section 31 performs a display process and a sound output process, and proceeds to the subsequent step. For example, on the basis of the operation object position data Db and the sound object position data Dd, the control section 31 performs the process of generating an image of the virtual world where the operation object OBJo and the sound objects OBJs are placed, and causing the generated image to be displayed on the display section 35. Further, on the basis of the game score data Df, the control section 31 performs the process of generating an image representing the current game score, and causing the generated image to be displayed on the display section 35. Furthermore, on the basis of the pitch data Dg and the composition performed in the game, the control section 31 performs the process of generating sound data, and outputting the sound based on the sound data from the sound output section 36. Specifically, the control section 31 generates the sound data, for the sound to be output as a result of the sound object OBJs and the operation object OBJo making contact with each other, so that the sound represented by the pitch data Dg (if data representing the pitch is set, the sound at the indicated pitch) is output from the sound output section 36.

Next, the control section 31 determines whether or not the game processing is to be ended (step 50). Examples of conditions for ending the game processing include: the satisfaction of the condition under which the game processing is ended; and the fact that the user has performed the operation of ending the game processing. If the game processing is not to be ended, the control section 31 returns to the above step 42, and repeats the process thereof. If the game processing is to be ended, the control section 31 ends the processing indicated by the flow chart.

As described above, on the basis of the game processing according to the exemplary embodiment described above, the operation object OBJo is brought into contact with the sound objects OBJs that appear in accordance with a composition, whereby it is possible to output the sounds set for the respective sound objects OBJs, and therefore possible to enjoy performing the composition. Here, in accordance with a touch operation, the user can freely cause the operation object OBJo to move in the movement-allowed range (along the movement path or in the movement range) so as to make contact with the sound objects OBJs, and output the sounds based on the composition merely by placing the operation object OBJo on the movement paths of the sound objects OBJs. This makes it possible to enjoy a music game by an easy touch operation.

It should be noted that the above descriptions are given using the example where the game apparatus 3 performs the game processing. Alternatively, another apparatus may perform at least some of the processing steps in the game processing. For example, if the game apparatus 3 is further configured to communicate with another apparatus (for example, another server, another game apparatus, or another mobile terminal), the other apparatus may cooperate to perform the processing steps of the game processing. As an example, the other apparatus may generate a virtual world and a sound and perform the game processing using the virtual world, and the result of the game processing may be displayed on the display section 35 of the game apparatus 3. Another apparatus may thus perform at least some of the processing steps in the game processing, which enables game processing similar to that described above. Further, the game processing described above can be performed by a processor or the cooperation of a plurality of processors, the processor and the plurality of processors contained in an information processing system including at least one information processing apparatus. Further, in the exemplary embodiment, the processing indicated in the flow chart described above is performed as a result of the control section 31 of the game apparatus 3 executing a predetermined game program. Alternatively, some or all of the game processing indicated in the flow chart may be performed by a dedicated circuit included in the game apparatus 3.

Here, the above variations make it possible to achieve the exemplary embodiment also by a system form such as cloud computing, or a system form such as a distributed wide area network or a local area network. For example, in a system form such as a distributed local area network, it is possible to execute the game processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the game processing described above. Thus, it goes without saying that it is possible to achieve the exemplary embodiment by sharing the processing in any manner.

In addition, the processing orders, the setting values, the conditions used in the determinations, and the like that are used in the game processing described above are merely illustrative. Thus, it goes without saying that the exemplary embodiment can be achieved also with other orders, other values, and other conditions.

In addition, the game program may be supplied to the game apparatus 3 not only through an external storage medium such as the external memory 45, but also through a wired or wireless communication link. Further, the game program may be stored in advance in a non-volatile storage device included in the game apparatus 3. It should be noted that examples of an information storage medium having stored therein the game program may include CD-ROMs, DVDs, optical disk storage media similar to these, flexible disks, hard disks, magneto-optical disks, and magnetic tapes, as well as non-volatile memories. Alternatively, an information storage medium having stored therein the game program may be a volatile memory for storing the game program. It can be said that such a storage medium is a storage medium readable by a computer or the like. For example, it is possible to provide the various functions described above by causing a computer or the like to load a game program from the storage medium and execute it.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, a computer-readable storage medium having stored therein a game program, a game program, a game apparatus, a game system, a game processing method, and the like in order to enjoy a music game by an easy operation.

What is claimed is:

1. An apparatus comprising:
   a display screen;
   a touch panel configured to receive a touch input on the display screen; and
   at least one processor operatively coupled to the display screen and the touch panel, the at least one processor being configured to at least:
   control the display screen to display an operation object that is movable in a movement-allowed region corresponding to a portion of the display screen;
   control the display screen to cause a plurality of sound objects to appear in accordance with a musical composition outside of the movement-allowed region, and to automatically move the plurality of sound objects along a plurality of movement paths that cross the movement-allowed region, the sound objects set for sounds to be output in accordance with the musical composition to be performed;
   in accordance with a touch input on the display screen received by the touch panel, move the operation object in the movement-allowed region;
   determine whether or not the operation object, responsive to movement made in accordance with the received touch input, makes contact with one of the sound objects automatically moving along one of the movement paths crossing the movement-allowed region; and
   upon determining that the operation object makes contact with one of the sound objects and that the touch input on the display screen is maintained when the operation object makes contact with one of the sound objects, generate sound data based on the sound set for the sound object determined to contact the operation object and control output of sound based on the generated sound data, wherein the operation object includes at least a first region and a second region, and the sound data differs in accordance with which of the first region or the second region of the operation object has made contact with the sound object,
   wherein (1) the sound data includes the set sound for the sound object contacting the operation object when the sound object has made contact with the first region of the operation object, and (2) the sound data includes the set sound for the sound object contacting the operation object with a change in loudness, pitch, and/or timbre, from when contact is made in the first region, when the sound object has made contact with the second region of the operation object.

2. The apparatus of claim 1, wherein the movement-allowed region is a circular movement path and the sound objects are moved so as to cross the circular movement path.

3. A game system, including a plurality of apparatuses configured to communicate with each other, for outputting a sound based on an operation input, the game system comprising:
   a display screen;
   a touch panel configured to receive a touch input on the display screen; and
   at least one processor operatively coupled to the display screen and the touch panel, the at least one processor being configured to at least:
   control the display screen to display an operation object that is movable in a movement-allowed region corresponding to a portion of the display screen;
   control the display screen to cause a plurality of sound objects to appear in accordance with a musical composition outside of the movement-allowed region, and to automatically move the plurality of sound objects along a plurality of movement paths that cross the movement-allowed region, the sound objects set for sounds to be output in accordance with the musical composition to be performed;
   in accordance with a touch input on the display screen received by the touch panel, move the operation object in the movement-allowed region;
   determine whether or not the operation object, responsive to movement made in accordance with the received touch input, makes contact with one of the sound objects automatically moving along one of the movement paths crossing the movement-allowed region; and
   upon determining that the operation object makes contact with one of the sound objects and that the touch input on the display screen is maintained when the operation object makes contact with one of the sound objects, generate sound data based on the sound set for the sound object determined to contact the operation object and control output of sound based on the generated sound data, wherein the operation object includes at least a first region and a second region, and the sound data differs in accordance with which of the first region or the second region of the operation object has made contact with the sound object,
   wherein (1) the sound data includes the set sound for the sound object contacting the operation object when the sound object has made contact with the first region of the operation object, and (2) the sound data includes the set sound for the sound object contacting the operation object with a change in loudness, pitch, and/or timbre, from when contact is made in the first region, when the sound object has made contact with the second region of the operation object.

4. A game processing method to be executed by a processor or a cooperation of a plurality of processors, the processor and the plurality of processors contained in a system including at least one information processing apparatus for outputting a sound based on an operation input, the game processing method comprising:

controlling a display screen to display an operation object that is movable in a movement-allowed region corresponding to a portion of the display screen;

controlling the display screen to cause a plurality of sound objects to appear in accordance with a musical composition outside of the movement-allowed region, and to automatically move the plurality of sound objects along a plurality of movement paths that cross the movement-allowed region, the sound objects set for sounds to be output in accordance with the musical composition to be performed;

in accordance with a touch input on the display screen, moving the operation object in the movement-allowed region;

determining whether or not the operation object, responsive to movement made in accordance with the touch input, makes contact with one of the sound objects automatically moving along one of the movement paths crossing the movement-allowed region; and upon determining that the operation object makes contact with one of the sound objects and that the touch input on the display screen is maintained when the operation object makes contact with one of the sound objects, generating sound data based on the sound set for the sound object determined to contact the operation object and outputting sound based on the generated sound data, wherein the operation object includes at least a first region and a second region, and the sound data differs in accordance with which of the first region or the second region of the operation object has made contact with the sound object, wherein (1) the sound data includes the set sound for the sound object contacting the operation object when the sound object has made contact with the first region of the operation object, and (2) the sound data includes the set sound for the sound object contacting the operation object with a change in loudness, pitch, and/or timbre, from when contact is made in the first region, when the sound object has made contact with the second region of the operation object.

5. A non-transitory computer-readable storage medium having stored therein a game program to be executed by a computer of an apparatus for outputting a sound based on an operation input, the game program, when executed, causing the computer to at least:

display, on a display screen, an operation object that is movable in a movement-allowed region corresponding to a portion of the display screen;

cause a plurality of sound objects to appear, on the display screen, in accordance with a musical composition outside of the movement-allowed region, and automatically move the plurality of sound objects along a plurality of movement paths that cross the movement-allowed region, the sound objects set for sounds to be output in accordance with the musical composition to be performed;

in accordance with a touch input received by a touch panel, move the operation object in the movement-allowed region;

determine whether or not the operation object, responsive to movement made in accordance with the received touch input, makes contact with one of the sound objects automatically moving along one of the movement paths crossing the movement-allowed region; and upon determining that the operation object makes contact with one of the sound objects and that the touch input on the display screen is maintained when the operation object makes contact with one of the sound objects, generate sound data based on the sound set for the sound object determined to contact the operation object and control output of sound based on the generated sound data, wherein the operation object includes at least a first region and a second region, and the sound data differs in accordance with which of the first region or the second region has made contact with the sound object, wherein (1) the sound data includes the set sound for the sound object contacting the operation object when the sound object has made contact with the first region of the operation object, and (2) the sound data includes the set sound for the sound object contacting the operation object with a change in loudness, pitch, and/or timbre, from when contact is made in the first region, when the sound object has made contact with the second region of the operation object.

6. The non-transitory computer-readable storage medium having stored therein the game program according to claim 5, wherein the plurality of sound objects are formed of a plurality of types of sound objects differing in accordance with steps of sounds set for the respective sound object.

7. The non-transitory computer-readable storage medium having stored therein the game program according to claim 6, wherein the plurality of movement paths are set in accordance with the steps of the respective sounds to be output, and the sound objects move along the movement paths based on the steps set for the respective sound objects.

8. The non-transitory computer-readable storage medium having stored therein the game program according to claim 7, wherein the movement-allowed region is provided so as to extend in a left-right direction or an up-down direction in a virtual world displayed on the display screen; and the sound objects move along the plurality of movement paths provided orthogonal to the movement-allowed region of the operation object.

9. The non-transitory computer-readable storage medium having stored therein the game program according to claim 5, wherein if the sound object has made contact with the second region of the operation object, an amount of change in a pitch of a sound is set and/or an amount of change in a loudness of a sound is set in accordance with a distance between the first region and the contact position, and a sound obtained by changing the pitch and/or the loudness of the sound set for the sound object by the set amount is output.

10. The non-transitory computer-readable storage medium having stored therein the game program according to claim 5, wherein
- a sound obtained by changing loudness, pitch, and/or timbre of the sound set for the sound object is output in accordance with a time when the operation object and the sound object have made contact with each other.

11. The non-transitory computer-readable storage medium having stored therein the game program according to claim 5, further causing the computer to execute
- evaluating an operation of the user in accordance with a state of contact of the operation object and the sound object, wherein
- the evaluation differs in accordance with a time when the operation object and the sound object have made contact with each other.

12. The non-transitory computer-readable storage medium having stored therein the game program according to claim 5, wherein
- in a virtual space displayed on the display screen, a movement-allowed path provided on a plane parallel to the display screen is set as the movement-allowed region, and the operation object moves along the movement-allowed path; and
- the sound objects move along the plurality of movement paths provided so as to extend in a depth direction in the virtual space.

13. The non-transitory computer-readable storage medium having stored therein the game program according to claim 5, wherein the movement-allowed region is a circular movement path and the plurality of sound objects are moved so as to cross the circular movement path.

* * * * *